Jan. 10, 1956     R. D. HOFFMAN     2,730,101
TEAT BISTOURY WITH EXPANSIBLE CUTTER KNIVES
Filed Feb. 23, 1954     2 Sheets-Sheet 1
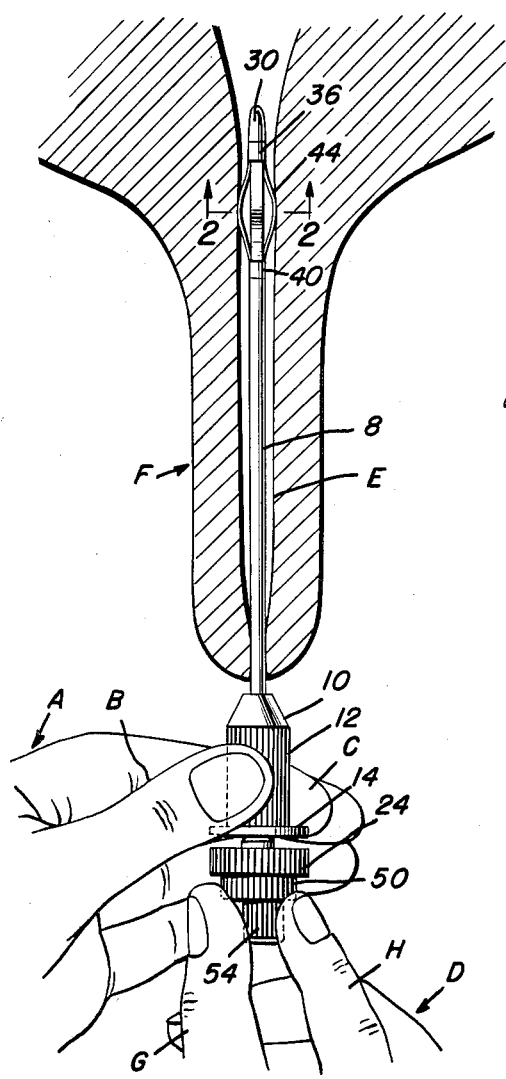
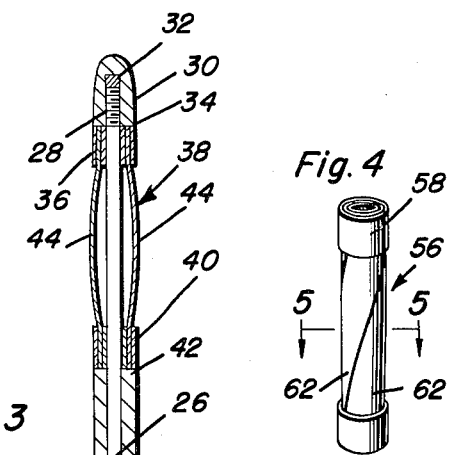
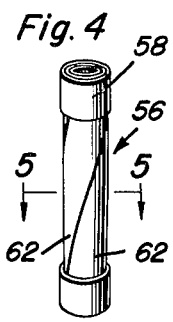
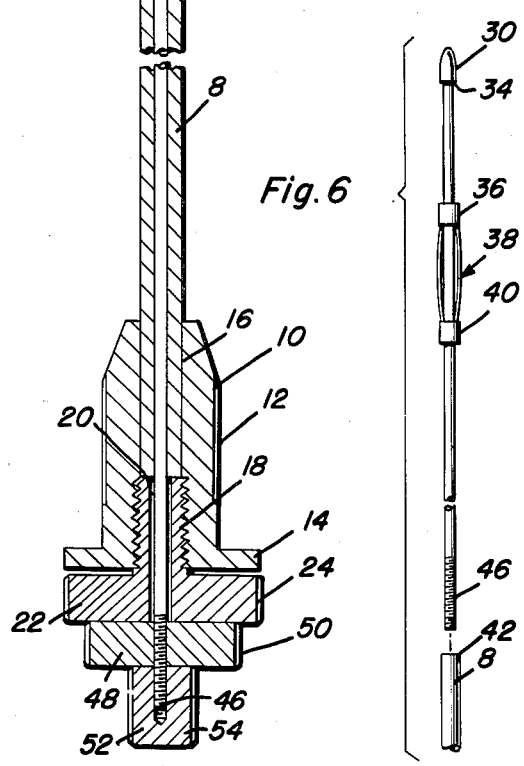
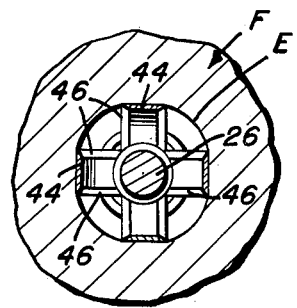
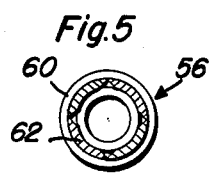
Roy D. Hoffman
INVENTOR.

Jan. 10, 1956     R. D. HOFFMAN     2,730,101
TEAT BISTOURY WITH EXPANSIBLE CUTTER KNIVES
Filed Feb. 23, 1954                          2 Sheets—Sheet 2
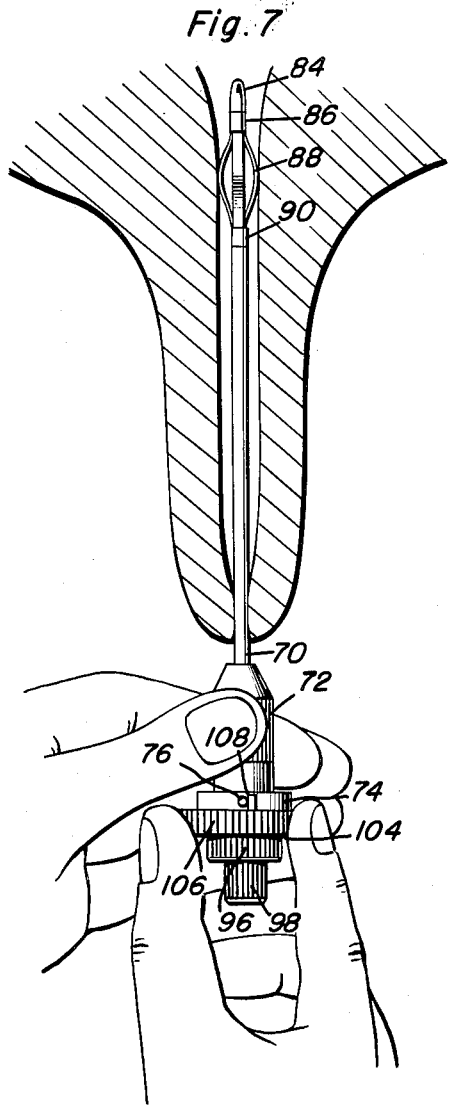
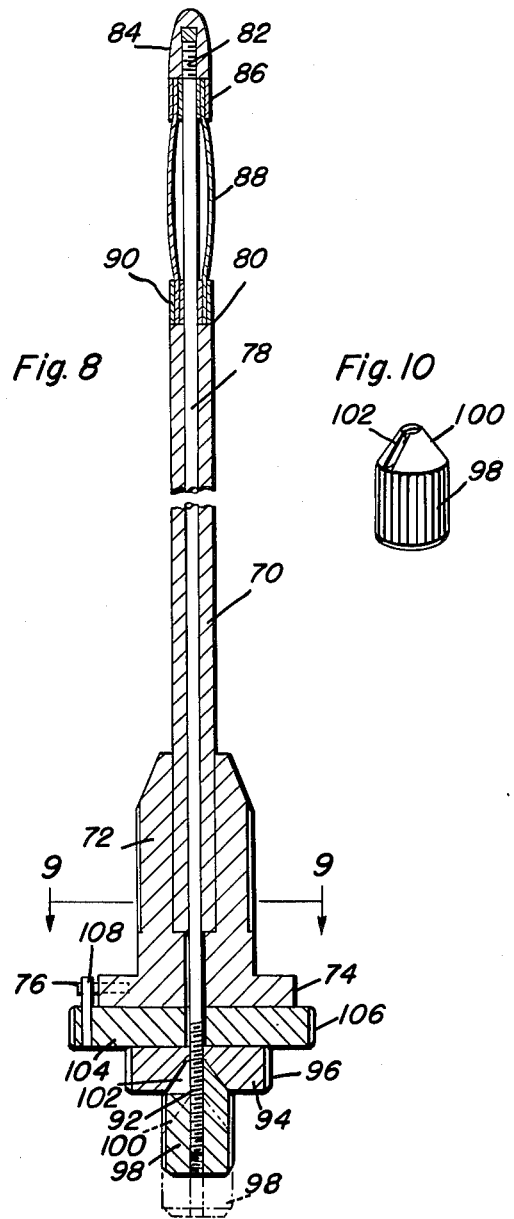
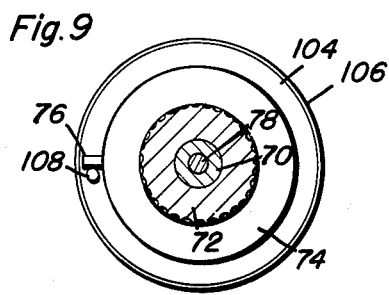
Roy D. Hoffman
INVENTOR.

United States Patent Office 2,730,101
Patented Jan. 10, 1956

2,730,101
TEAT BISTOURY WITH EXPANSIBLE CUTTER KNIVES

Roy D. Hoffman, Bedford, Pa.

Application February 23, 1954, Serial No. 411,935

10 Claims. (Cl. 128—305)

The present invention relates to teat instruments, generally speaking, and has more particular reference to a novelly constructed and aptly performing teat bistoury characterized by readily expansible and contractible cutter means usable advantageously in opening up "plugged" or "clogged" milk ducts, or canals, as they are referred to, in a practicable, expedient, and efficacious manner.

In carrying out the principles of the invention, I have evolved and produced a highly practical and efficient bistoury in which manufacturers, veterinarians and others will find their respective requirements and needs effectually taken into account and met, an instrument in which regulatable adjustment is had and precision usefulness is assured, thereby to promote keen cleavage and safe operational results.

Another object of the invention has to do with a bistoury which is characterized by a barrel and cooperating rod member and wherein a novel cutter unit is mounted on and carried by the rod member and is readily applicable and removable and is characterized by expansible and contractible blades or knives which, when expanded, permit cuttings to enter between the blades and to be trapped within the confining limits of the cooperating blades and, when the blades are contracted and closed, permits the then trapped cuttings to be drawn out of the teat canal for analysis, diagnosis and subsequent disposal.

Another object of the invention is to provide an instrument wherein all blades are longitudinally beveled on the inside surfaces and are smooth surfaced on the outside, which construction aids in confining the cuttings within the cutter and wherein the blades, being sharp along both longitudinal edges, make it possible to remove large growths, this being accomplished easily by cutting the growths with an oscillating or back and forth movement or a straight around rotating movement either clockwise or counter-clockwise, as the case may be.

Another object of the invention has to do with a construction in which the elements and parts are such that the entire instrument may be readily assembled and disassembled.

Briefly summarized, the invention, generally comprehended, is characterized by a rigid barrel-type teat bistoury comprising a rigid barrel having a stationary finger-grip fixed to the proximal end of the barrel, an insertable and removable rod rotatable and slidable in the bore of said barrel and having a piloting head on the leading end providing a shoulder, a cutter unit having longitudinally spaced ferrules rotatable with the shoulder of said rod and located between said head and the leading shoulder-forming end of said barrel, expansible and contractible blades connected at their respective ends to their respective ferrules, and means for sliding and rotating the rod characterized in one embodiment by a second but movable finger-grip, the adjacent end of said rod extending through and beyond said movable finger-grip, and shoulder means on the last named end portion of the rod having end thrust and rod adjusting engagement with said finger-grip.

Other objects, features and advantages will become more readily apparent from the following description and the accompanying sheet of illustrative drawings.

In the drawings, wherein like numerals are employed to designate like parts throughout the views:

Figure 1 is an elevational view of a teat bistoury constructed in accordance with the principles of the present invention and showing the manner in which the same is inserted and used in the canal of the teat shown;

Figure 2 is a section on the enlarged scale shown, said section being on the line 2—2 of Figure 1, looking in the direction of the arrows;

Figure 3 is a view in section and elevation of the complete bistoury;

Figure 4 is a perspective view of a modified form of cutter.

Figure 5 is a section on the line 5—5 of Figure 4, looking in the direction of the arrows;

Figure 6 is a fragmentary exploded view showing certain of the details with greater particularity;

Figure 7 is an elevational and sectional view similar to Figure 1 and showing a second embodiment of the invention and the manner in which it is constructed and used;

Figure 8 is a view similar to Figure 3, showing the details of construction in this modified form of the invention;

Figure 9 is a section on the line 9—9 of Figure 8, looking in the direction of the arrows; and Figure 10 is a perspective view of the chuck forming lock nut.

Referring now to the drawings (Figures 1 and 3) particularly to Figure 3, the rigid elongate barrel is denoted by the numeral 8. At one end, the bottom in the drawings, there is a cylindrical sleeve-like relatively stationary finger-grip or handle, as it is sometimes called. This is denoted by the numeral 10 and it has a knurled or equivalent peripheral surface 12 and an outstanding flange 14. This finger-grip is integrated or fixed in any suitable way, not shown, as at 16, to the lower end portion of the barrel. In fact, the barrel telescopes into said sleeve and terminates in spaced relation to the flanged end and this arrangement provides a socket 18 which is screw threaded and serves to accommodate the screw threaded hollow stem portion 20 of a relatively movable finger-grip. This finger-grip is sometimes referred to as a wheel, and it is denoted by the numeral 22 and has a milled or knurled periphery 24. The aforementioned rod is denoted at 26 and this passes through a bore in the finger-grips 22 and 10 and through the bore of the barrel where it projects beyond the barrel and terminates at its upper end in the screw threaded portion 28. There is a cap nut provided here and this is described as a piloting head 30 and it is soldered or otherwise fixed in place as at 32 and provides a stop shoulder 34 for the adjacent collar or ferrule 36 of the rotary cutter unit 38. The lower ferrule is denoted by the numeral 40 and this bears against the adjacent shoulder-forming end 42 of the barrel. The expansible and contractible cutter blades are of strap-like form and are circumferentially spaced at equidistant points and are denoted by the numerals 44—44. The opposite longitudinal edges are beveled as at 46 in Figure 2. By exerting lengthwise pressure on the rod, the latter is drawn "in" in such a manner that the shoulders 34 and 42 approach one another and thus squeeze and tense the cutting blades 44 and expand the same to longitudinal curvate form in the manner shown. The lower end of the rod extends through and beyond the finger-grip 22 where it is screw threaded, as at 46 in a manner to accommodate a nut 48 having a knurled peripheral surface 50 and also a lock nut 52 having a similar knurled peripheral surface 54. These nuts 48 and 52 constitute, collectively considered, an arrangement which is hereinafter construed as "shoulder means." By threading the stem 20 into the screw threaded socket 18 and interposing the grip 22 between the nut 48 and flange 14, the device is assembled and ready for operation. In fact, by catching hold of the fixed or stationary grip 10 with the left hand A between the thumb B and fingers C, then catching hold of the grip 22 with the fingers of the right hand D (not specifically shown), the grip 22 can be "backed out" and pressure exerted against the nut 48 to thus slide the rod 26 in the barrel 8 and to thus squeeze the cutter blades 44 and to expand and bow the same to operative form.

When the desired expanded adjustment is made, after the instrument is inserted into the canal E of the cow's teat, the device is ready for operation. By grasping the nuts 48 and 52 (now serving as finger-gripping means) between the thumb G and fingers H of the right hand D in the manner illustrated in Figure 1, it is possible to hold the barrel 8 steady with the left hand A and to twirl or whirl the rod 26 to the left or right, either clockwise or counter-clockwise, and since the cutter means 38 is frictionally held on the rod between the shoulders 34 and 42, the blades will turn in the canal and remove growths in the manner stated.

The modification of the cutter means in Figure 4 is denoted by the numeral 56 and this is characterized by longitudinally spaced ferrules 58 and 60 with the cutter blades 62—62 mounted therebetween. Here, the cutter blades, instead of being straight in a substantially lengthwise direction as shown in the form of the invention appearing in Figures 1–3, are helically twisted. Otherwise, the construction is the same and the performance and operation is similar to that already set forth.

Figure 6 is utilized to show that the rod 26 is removed or dismantled from the barrel 8 by removing the nuts 52 and 48 after which the rod may be slipped out of said barrel. Then, the cutter unit 38 may be slipped off the rod for repairs and other precision adjustments or replacements, as the case may be.

All blades are beveled on the inside with outer surfaces flat and smooth. This aids in confining cuttings within the knife. Blades are sharpened on both sides so that rotation may be made in either direction, which makes it possible to remove large growths. This is accomplished more readily by cutting growths with an oscillating movement, rotating clockwise or counter-clockwise, as desired.

It is possible to completely disassemble the instrument and remove all cuttings from the instrument. It is also possible to remove floating objects within the teat canal by forcing the object down by means used to milk a cow. The instrument is then turned in a rotating manner and through this means, the objects are caught in and trapped by the expanded blades.

Teats frequently have membranous growths across the canal. As indicated in the attached drawing, they can be removed by inserting the pointed part through the growth and expanding and rotating the blades. The blades grasp the membrane and remove it from its attachment. Teats frequently have so-called polyps at the base of the teat attachment. These can also be removed by inserting the point through the opening at the base of the teat canal. The instrument is then expanded and all of the objects are grasped between the blades. The instrument is then contracted and removed.

Occasionally, it so happens that a teat becomes tramped. A small enlargement occurs at the base known as the sphincter area. In these cases, the growths resemble a shot grain or BB. These can be removed by inserting the instrument expanding and rotating. They are also caught by contraction of the blades of the cutter unit. Occasionally, teats become tramped with hematoma developing in the canal. These are removed in the same manner. Objects referred to as calculi can also be removed in this same manner.

Reverting to certain of the structural characteristics, it will be seen that the so-called relatively stationary finger-grip 10 is cylindrical in cross-section and that the rear or trailing end portion of the tubular barrel 8 fits into the bore thereof and terminates short of the flange 14 to define the space for the socket, the wall of the socket being screw threaded to accommodate the stem 20. The nose portion of the head 30 is sufficiently constricted to pilot itself through the sphincter of the teat and yet is sufficiently rounded in a convex sense to be thought of as being blunt. The over-all cutter or knife unit 38 will have either linearly straight blades or helically twisted blades, as the case may be.

It is possible to back the primary nut 48 off the threads 46 by first loosening the lock nut 52. Then, the lock nut can be tightened up again so that the two nuts 48 and 52 act as a unit. In fact, these two nuts serve as a turning knob and provide a convenient hold for the fingers in the manner shown in Figure 1. This means that in expanding and contracting the cutter blades, the finger grip 22 is utilized and while turning the rod or shaft and the cutter unit in conjunction therewith, the two nuts 48 and 52 which are then bound together, as shown in Figure 1, are used as the rod rotating "knob" or means.

Attention is now directed to that form of the invention which is covered in Figures 7 to 10, inclusive. Here, the details are fundamentally the same, but are specifically distinct. The rigid barrel is denoted by the numeral 70, the same fitting into the axial socket portion of the fixedly secured externally knurled sleeve-like finger grip or handle 72. This is provided at its bottom with an enlarged flange 74 having an outstanding peripheral stop pin 76. The rotatable, slidable and removable rod 78 fits into the bore and extends beyond the outer end 80 of the barrel, where it is threaded at 82 and provided with a shoulder forming head 84 for the cooperating ferrule 86 carrying expansible and contractible cutting blades 88 joined at their lower ends to the lower ferrule 90 which bears against the shoulder 80. The lower end of the rod is screw threaded, as at 92, and threaded thereon is a nut 94 having a conical recess in its bottom side and having a knurled peripheral grip 96. A complemental knurled nut is denoted at 98 and this is threaded on the screw threaded end portion 92 and has a conical end 100 which is formed with a slot 102 and provides a sort of a chuck and extends into the conical socket in nut 94. Surrounding the rod and interposed between the nut 94 and the flange 74 is a washer-like finger grip 104 having a knurled periphery 106 and provided with a stop pin 108 which is carried by the outer projecting marginal edge portion which latter portion projects beyond the periphery 74 of the flange so as to bring the stop pin 108 into the path of movement and engageable relationship with the stop pin 76.

It will be noticed in comparing Figures 3 and 8 that the screw threaded socket 18 and stem 20 in Figure 3 is omitted in the form of the invention seen in Figure 8. Also, instead of having the abutting relationship between nuts 48 and 52 as seen in Figure 3, the conical socket in Figure 8 provides a locking chuck action between the two nuts 94 and 98. In order to slide the rod 78 in the bore of the barrel 70 in Figure 8, the nut 98 is backed off as shown in dotted lines, whereupon the nut 94 may now be turned against the abutment surface of the nut 104, causing the threaded end 92 to feed through and beyond nut 94 to thus exert downward pull on the head 84 and to strain and bend the cutting blades 88 to bowed position. Once the knife is opened, it is ready to cut in the manner shown in Figure 7. This requires that the lock nut 98 be turned back to its original place so that the two nuts 94 and 98 become, temporarily considered, a shoulder, which shoulder maintains, of course, contact with the abutment surface of the finger grip or nut 104. Now, by holding the finger grip 72 in the fingers of the left hand and grasping and turning the finger grip 104 (slightly different from the arrangement seen in Figure 1), the rod and cutter thereon may be oscillated to produce the desired exision results.

The stop pins 76 and 108 cooperate in limiting the turn of the finger grip or nut 104 to a 360° or single revolution movement, making it possible for the user to gauge the degree of rotation of the rod and cutter means carried thereby.

Reverting to the ferrules depicted for example in Fig. 3 and again in Fig. 8 it will be seen that these are of composite construction. That is, both ferrules 36 and 40 are made up of inner and outer concentric collars with the adjacent and cooperating blade-ends anchored and fastened therebetween. Thus, the four blades are joined with twin-part ferrules and the cutter is in this effect a unit and, of course, the blades are prevented from moving relative to each other but the cutter is turnable as a unit. It is repeated too, that the blades are beveled on the inside so that all cuttings tend to go into the center of the space provided by the blades and can be removed when the instrument is withdrawn. This construction also causes the blades to pull out through the material which the user wishes to cut. Manifestly, if the blades were sharpened with the bevel on the outside, the cuttings would go to the outside and could not be removed when the instrument is intentionally withdrawn.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A teat bistoury comprising a rigid barrel having a stationary finger grip fixed to one end of the barrel, a rod rotatable in the bore of said barrel and having a head on the leading end providing a shoulder, a cutter having longitudinally spaced ferrules rotatable with said rod and located between said head and the leading end of said barrel, expansible and contractible blades connected at their respective ends to their respective ferrules, a second but movable finger grip, the adjacent end portion of said rod extending through and beyond said movable finger grip, and shoulder means on the last named end portion of the rod, said movable finger grip being interposed between the stationary finger grip and said shoulder means and having end thrust and rod adjusting engagement with said shoulder means.

2. The structure defined in claim 1, and wherein said cutter comprises cutter blades which when expanded and spaced apart provide a receiver for cut flesh and when contracted and thus brought into close proximity to each other cooperate and constitute a trap for collecting and withdrawing the loosened flesh for analysis and other required purposes.

3. A teat bistoury comprising a rigid cylindrical linearly straight barrel whose leading end constitutes a stop shoulder, a stationary finger-grip cylindrical in cross-section and having a knurled peripheral surface and an outstanding flange at one end, the trailing end of said barrel telescoping into the bore of said finger-grip and terminating short of the flanged end of the latter and defining a socket, the wall of the latter being screw-threaded, a rotatable finger-grip having a hollow screw-threaded stem screwed into said socket and having its gripping portion parallel to and adjustable toward and from said flange, a cylindrical rod slidable and rotatable in the bore of said barrel and having a piloting head on its leading end to enter the canal of the teat to be operated on, said head also providing a shoulder and the latter being adjustable toward and from said stop shoulder, the other end of said rod being screw-threaded and passing axially through and beyond said socket as well as through and beyond the bore of said stem and trailing side of said rotatable finger-grip, a first nut operatively mounted on the protruding portion of said screw-threaded end and opposed in proximity to said rotatable finger-grip, a second nut, this a locknut, also operatively mounted on said screw-threaded end and abutting said first named nut, and a cutter unit interposed between said head and stop shoulder, said unit having expansible and contractible blades and spaced complements, the latter encircling the portion of the rod between said head and stop shoulder.

4. In a teat bistoury, a linearly straight cylindrical rod having a blunt-ended piloting head on its leading end, said head being cylindrical in cross-section and of a cross-section greater than the cross-section of the rod and the trailing end of the head providing a stop shoulder, a cutter unit embodying a pair of collar-like ferrules and resilient cutter blades, the latter anchored at their respective ends to the respective ferrules, said blades having their lengthwise inwardly facing surfaces beveled and defining cutting edges, said ferrules being slidably and rotatably mounted on said rod, one of said ferrules abutting said stop shoulder, a barrel in which said rod is mounted for operation, one end of said barrel abutting said other ferrule, and means on the other ends of the barrel and rod for sliding and rotating said rod relative to said barrel.

5. A teat bistoury comprising a rigid barrel having a stationary finger grip fixed to one end of the barrel, a rod rotatable in the bore of said barrel and having a head on the leading end providing a shoulder, a cutter having longitudinally spaced ferrules rotatable with said rod and located between said head and the leading end of said barrel, expansible and contractible blades connected at their respective ends to their respective ferrules, a second but movable finger grip having a hollow screw threaded stem screwed into a screw threaded socket provided therefor in said stationary finger grip, the adjacent end of said rod extending through said stem and beyond said movable finger grip, and shoulder means on the last named end portion of the rod, said movable finger grip being interposed between the stationary finger grip and said shoulder means and having end thrust and rod adjusting engagement with said shoulder means.

6. A teat bistoury comprising a rigid barrel, a stationary finger grip fixed to one end of the barrel, a rod rotatable in the bore of said barrel and having a head on the leading end providing a shoulder, a cutter having longitudinally spaced ferrules rotatable on said rod and located between said head and the leading end of said barrel, expansible and contractible blades connected at their respective ends to their respective ferrules, the trailing end of said rod extending through and beyond the bore in said stationary finger grip and being screw threaded, an adjusting nut threaded on said screw threaded end, a second nut also threaded on said screw threaded end and constituting a lock nut, and a relatively movable washer providing a movable finger grip surrounding said rod and interposed between said first nut and the trailing end of said stationary finger grip.

7. A teat bistoury comprising a rigid barrel, a stationary finger grip fixed to one end of the barrel, a rod rotatable in the bore of said barrel and having a head on the leading end providing a shoulder, a cutter having longitudinally spaced ferrules rotatable on said rod and located between said head and the leading end of said barrel, expansible and contractible blades connected at their respective ends to their respective ferrules, the trailing end of said rod extending through and beyond the bore in said stationary finger grip and being screw threaded, an adjusting nut threaded on said screw threaded end, a second nut also threaded on said screw threaded end and constituting a lock nut, and a relatively movable washer providing a movable finger grip surrounding said rod and interposed between said first nut and the trailing end of said stationary finger grip, said washer being of a diameter appreciably greater than the adjacent end portion of said stationary finger grip and having a projecting peripheral portion provided with a lateral stop pin, said stationary finger grip having an outstanding flange, and said flange having a marginal edge provided with a stop pin with which said first named stop pin is engageable.

8. The structure defined in claim 7, and the combination therewith of a conical recess formed in the bottom of said first named nut, the second nut having a conical end fitting into said recess, said conical end being lengthwise slitted and providing a chuck.

9. A teat bistoury comprising, in combination, a rigid elongate barrel linearly straight whose leading end constitutes a shoulder, a relatively stationary finger-grip fixed to one end of the barrel, a rigid rod slidable and rotatable in the bore of said barrel, a blunt-ended piloting head fixed on the leading end of said rod, said head being of a cross-section greater than the cross-section of the rod and the trailing end of the head providing a shoulder, a cutter embodying radially expansible and contractible lengthwise blades having their respective end portions attached to and connected by assembling members which are rotatable and slidable on that portion of the rod between the barrel and said head, said members engaging the respective shoulders, the adjacent lengthwise edges of the respective cutter blades being spaced apart when the blades are expanded and being in close substantially closed proximity to each other when the blades are contracted, and manually actuatable and regulable means cooperable with the adjacent respective trailing end portions of said stationary finger-grip and said rod for sliding the rod through the bore of the barrel in a manner to expand or contract the cutter blades and, in addition, for twirling and rotating the rod in the bore of the barrel in a manner to rotatably operate said cutter.

10. The structure defined in claim 9, and wherein the exterior surfaces of the blades are plane and smooth, and the lengthwise inwardly facing surfaces of said blades are each beveled to define a cutting edge.

References Cited in the file of this patent
UNITED STATES PATENTS

| | | |
|---|---|---|
| 618,521 | Palmer | Jan. 30, 1899 |
| 687,112 | Bowker | Nov. 19, 1901 |
| 1,092,914 | Jones | Apr. 14, 1914 |
| 1,786,520 | Darling | Dec. 30, 1930 |